Feb. 10, 1931.  L. KUHL  1,792,227
METHOD AND MEANS FOR REGULATING CONTINUOUSLY WORKING
ABSORPTION REFRIGERATING MACHINES
Filed June 19, 1928
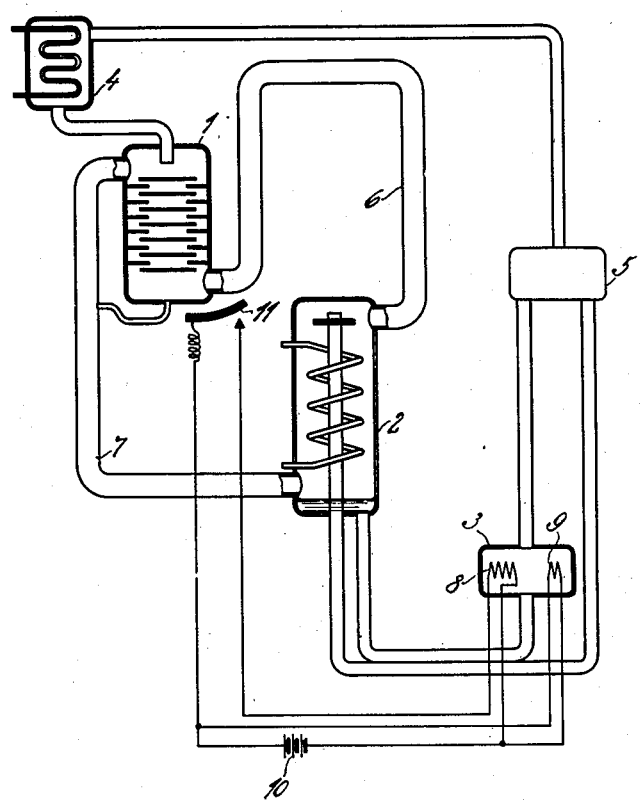
Inventor
Leo Kuhl
by Knight Bro
attorneys Patented Feb. 10, 1931

1,792,227

UNITED STATES PATENT OFFICE

LEO KUHL, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

METHOD AND MEANS FOR REGULATING CONTINUOUSLY WORKING ABSORPTION REFRIGERATING MACHINES

Application filed June 19, 1928, Serial No. 286,586, and in Germany June 22, 1927.

My invention relates to a method and means for regulating continuously working absorption refrigerating machines.

When it is desired to regulate heating apparatus automatically so that a certain temperature is attained the source of heat is usually automatically cut off as soon as a certain maximum temperature is exceeded and automatically turned on again as soon as a certain minimum temperature has been reached. This method is also applicable for regulating automatically the cooling temperature produced by a refrigerating machine. If the source of heat is a gas flame, it is usual not to cut off the supply of gas altogether when the maximum temperature has been reached, but to leave a small pilot light burning, which suffices to ignite the jets of gas, when the gas is again turned on.

According to my invention the source of heat of continuously operating absorption refrigerating machines remains operative even when temperature has dropped below the minimum temperature limits, to such an extent, that it at least just suffices to keep the expeller or boiler at the temperature necessary to expel the operating medium. While in apparatus serving for maintaining a higher temperature the dropping of the temperature generated causes an instant increase in heat supply by means of an automatic regulating device, this does not happen in the case of refrigerating machines. Here under particularly favorable working conditions, i. e. at a low prevailing temperature and small demand, the necessary cooling temperature may be maintained for a considerable time without reheating being necessary. This would, however, have the result, that the expeller boiler would lose its temperature necessary for expelling the operating medium and that when a great demand for low temperatures arises suddenly, quite an appreciable time would pass until this temperature is restored and the absorption machine is again in full operation. The advantage of the continuously working absorption refrigerating machine as compared with the intermittently operating one just resides in the feature, that the alternate heating and cooling of the absorption solution is avoided, which involves losses in energy and time. In the method and with the expedients employed according to my invention the supply of cold commences at once if a demand arises.

In many cases it is advisable to allow a certain amount of heat supply to continue to such an extent, that a certain amount of cold is continuously supplied as before, for instance to retrieve the losses incurred even under the most favorable circumstances by the defects in heat insulation of the rooms to be cooled. The continuity of the service is in this way maintained to a particularly great extent.

My improved method may in the case of electric heating be carried through in the well known manner, by throwing a heating resistance out of circuit when the lowest desirable temperature is reached and by throwing it in when a desirable maximum temperature is exceeded. This has at the same time the advantage, that the entire heating energy need not be cut out each time and that arcing at the contacts is consequently considerably reduced.

This advantage is of particularly great importance in automatic regulating mechanisms, which are expected to operate for years without any particular supervision.

An arrangement involving these novel features is by way of example, diagrammatically illustrated in the drawing affixed hereto and forming part of my specification. It will be understood, however, that my invention is by no means limited to the particular form of a continuously operating absorption refrigerating machine shown, and which represents the type of machine described more fully in my copending application Serial No. 226,768 of October 17, 1927.

Referring to the drawing, 1 is the evaporator in which the low temperature is produced, 2 the absorber, 3 the expeller in which by means of a heating device a gaseous operating medium (such as ammonia) is expelled from an absorption solution. In the condenser 4 the gaseous medium is again condensed or reduced to the liquid state, after it has been separated from the absorption liquid in a gas separator 5. In the evaporator and absorber an inert, i. e. practically non-absorbable gas (such as air) is admixed to the gaseous operating medium for reasons more fully described in aforesaid application. The gas mixture circulates through the pipes 6 and 7, which put the absorber and the evaporator in communication with each other.

In the particular example shown an electric heat supply is employed, and for this purpose two electric heating resistors 8 and 9 are located within expeller 3 and are connected to a source of current 10, these resistors being so dimensioned, that more heat is developed by the resistor 8 than by the resistor 9. The resistor 9 is connected to the source of current 10 directly and permanently, the resistor 8 on the other hand is controlled by a thermal relay 11, which, for instance, may consist of a bi-metallic strip of conventional type, adapted to respond to the temperature variations of the room cooled by the evaporator 1. The resistor 8 is consequently automatically cut out at the desirable lowest temperature limit and switched in again when the highest desirable temperature is exceeded. The resistor 9 remains permanently in circuit. It develops such a temperature, that the expeller 3 is maintained at the temperature necessary for the immediate resumption of the production of cold by the expulsion of gaseous working medium, when the main heat supply is resumed.

Various modifications and changes may be made without departing from the spirit and the scope of the invention, and I desire, therefore, that only such limitations shall be placed thereon as are imposed by the prior art.

I claim as my invention:

1. Means for regulating continuously working absorption refrigerating machines, comprising an automatic regulating member responsive to temperature variations, an expeller containing the operating medium and the absorption solution, a variable heat supply for said expeller, controlled by said regulating member when the desirable maximum and minimum temperatures are attained in the machine, and a fixed permanent heat supply for said expeller only sufficient for approximately maintaining the expeller temperature necessary for the expulsion of the operating medium, but not sufficient for developing gas bubbles out of the absorption solution.

2. The method of regulating continuously operating absorption machines in accordance with the temperature requirements of refrigeration comprising the step of supplying permanently a fixed amount of heat to the expeller, sufficient to maintain the absorption solution therein at a temperature necessary for expelling operating medium, but not sufficient for developing gas bubbles out of said solution, and the step of supplying an additional amount of heat to the expeller when the evaporator temperature rises above a desired limit.

In testimony whereof I affix my signature.

LEO KÜHL.